United States Patent [19]

Schaffer

[11] Patent Number: 4,926,374

[45] Date of Patent: May 15, 1990

[54] RESIDUE CHECKING APPARATUS FOR DETECTING ERRORS IN ADD, SUBTRACT, MULTIPLY, DIVIDE AND SQUARE ROOT OPERATIONS

[75] Inventor: Mark M. Schaffer, Endicott, N.Y.

[73] Assignee: International Business Machines Corporation, Armonk, N.Y.

[21] Appl. No.: 276,200

[22] Filed: Nov. 23, 1988

[51] Int. Cl.⁵ .............................................. G06F 11/10
[52] U.S. Cl. .................................................... 364/739
[58] Field of Search .................................. 371/739, 737

[56] References Cited

U.S. PATENT DOCUMENTS

| | | |
|---|---|---|
| 3,227,865 | 1/1966 | Hoernes .............................. 364/739 |
| 3,624,373 | 11/1971 | Birchall .............................. 364/739 |
| 3,659,089 | 4/1972 | Payne et al. ........................ 364/739 |
| 3,699,323 | 10/1972 | Reinheimer ........................ 364/739 |
| 3,814,923 | 6/1974 | Wang .................................. 364/739 |
| 3,816,728 | 6/1974 | Chen et al. ......................... 364/739 |

*Primary Examiner*—Charles E. Atkinson
*Attorney, Agent, or Firm*—Baker, Maxham, Jester & Meador

[57] ABSTRACT

The invention concerns a residue checking apparatus which uses common circuitry to conduct residue checking of the outcome of an arithmetic operation which may be an add, a subtract, a multiply, a divide, or a square root operation.

4 Claims, 3 Drawing Sheets

RESIDUE CHECKING APPARATUS FOR DETECTING ERRORS IN ADD, SUBTRACT, MULTIPLY, DIVIDE AND SQUARE ROOT OPERATIONS

BACKGROUND OF THE INVENTION

The invention is in the field of arithmetic operations performed by a digital computer and more particularly concerns detection of errors in add, subtract, multiply, divide, and square root operations performed by a digital computer.

In the prior art, means and techniques are provided for verifying the correctness of arithmetic and logical operation results. Apparatus are known for employing residue correlatives of the operands and results of add and subtract operations to check the veracity of the results. An apparatus is also taught in U.S. Pat. No. 3,227,865 for residue-based verification of a division operation.

However, the prior art does not include a single apparatus employing residue techniques to verify the outcomes of all of the arithmetic operations encountered in modern digital computing. In this regard, no single apparatus is known which can, based upon residues, check the results of add, subtract, multiply, divide, and root-taking operations.

Given the emphasis in modern computer design upon reduction of size and component count, it is manifest that manifold functionality for computer components is very desirable. In this vein, the inventor provides a single computer component with the ability to perform verification for the outcome of any one of these arithmetic operations.

SUMMARY OF THE INVENTION

The invention is founded upon the critical observation that the complex operations of residue checking for divide and square root operations can be reduced to simple operations including only addition and multiplication. Addition and multiplication also form the essential complement of operations necessary to perform residue checking of add, subtract, and multiply operations.

In this application, the term "residue checking" refers to the use of the mathematical residues of operands, results, and remainders to verify the result of a mathematical operation. Relatedly, the "residue" refers to the remainder produced by modulo-N division of a number.

The invention is expressed as an improvement in an arithmetic processor which performs arithmetic operations including addition, subtraction, multiplication, divisior and square root, the operations being performed on a pair of binary operands A and B, the operations producing a result, and at least the division and square root operations providing a remainder. The improvement is an apparatus for residue checking the results of all of these operations. The residue checking apparatus includes provision for producing residue signals, a first residue signal indicating a residue of A, a second residue signal indicating a residue of B, a third residue signal indicating a residue of the result, and a fourth residue signal indicating a residue of the difference produced by subtracting a remainder from B. An arithmetic unit is provided for multiplying two residule quantities to produce a residue result signal. A first selector is attached to the provision for producing the residue signals and to the arithmetic unit for selectively providing a pair of the residue signals to the arithmetic unit. The first selector provides a first pair of residue signals including the first and third residue signal at the end of a divide operation and a second pair of residue signals including the second residual signal and third residue signal at the end of a square root operation. A comparator is connected to the provision for producing residue signals and to the arithmetic unit for comparing the fourth residue signal with the residue result signal to produce an error signal when the fourth residue signal is not equal to the residue result signal.

In the improvement, the first selector provides a third pair of residue signals including the first and second residue signals to the arithmetic unit during a multiplication operation. The improvement further includes a second selector connected to the provision for producing the residue signal and to the comparator for selectively providing the fourth residue signal to the comparator when the first or second pair of residue signals is provided to the arithmetic unit and the third residue signal to the comparator when the third pair of residue signals is provided to the arithmetic unit.

In the improvement, the arithmetic unit includes an adder for adding a pair of residue signals to produce the residue result signal, the adder adding the first and second residue signals during an add or subtract operation to produce the residue result signal, the second selector providing the third residue signal to the comparator when the adder adds the first and second residue signals to produce the residue results signal.

It is therefore an object of this invention to provide a residue checking apparatus which can verify the result of an add, subtract, multiply, divide, or square root operation performed on a pair of operands.

Other objects and advantages of this invention will become evident when the following description is read in conjunction with the below-summarized drawings.

DETAILED DESCRIPTION OF THE PREFERRED EMBODIMENT

In this description, the existence of a digital computer capable of performing a basic complement of arithmetic operations including addition, subtraction, multiplication, division, and square root-taking on a pair of operands, A and B, is presumed. Such capability is found, for example, in the SYSTEM/370 computer family produced by the International Business Machines Corporation, the assignee of this patent application. Means for performing these operations in such computers are presumed. A representative block diagram of a functional unit performing these operations is illustrated in FIG. 1.

Figure 1:
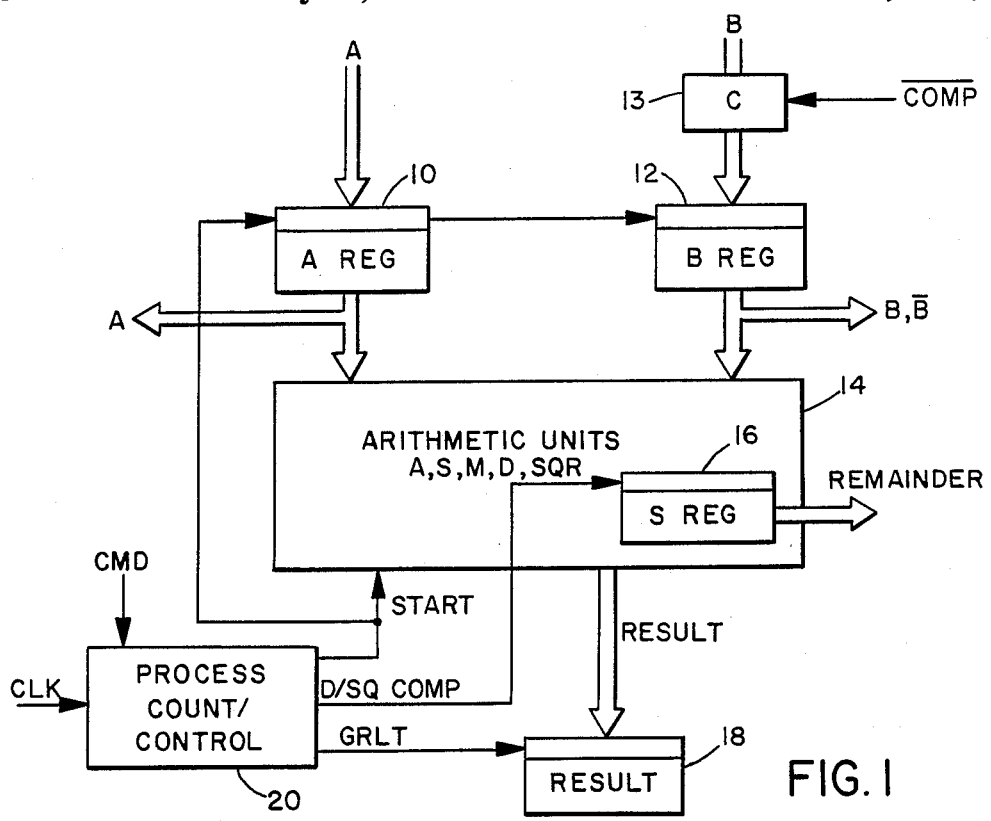
FIG. 1 is the block diagram of a modern arithmetic unit performing add, subtract, multiply, divide, or square root operations on a pair of operands, A and B.
Figure 2:
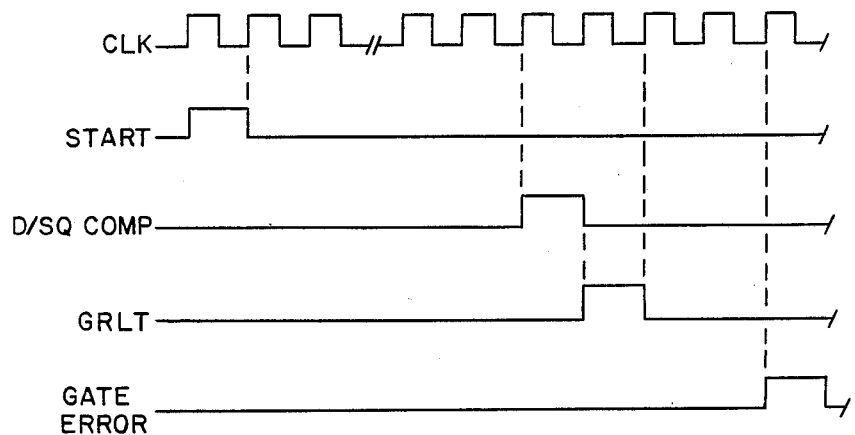
FIG. 2 is a timing diagram including waveforms illustrating a sequence of events occurring during arithmetic operations.

In FIG. 1, a pair of operands, A and B, consisting of digital representations of decimal numbers are provided to a pair of registers, 10 and 12, respectively. Some operations, such as subtraction, require complementation of operand B. Complementation of B is performed conventionally in complementing circuitry (C) represented by block 13, which responds to a complementation signal (COMP) to perform a complementing operation on operand B.

After registration, the operands A and B are provided to an arithmetic unit 14 which performs one of the operations of addition, subtraction, multiplication, division, or root-taking (A, S, M, D, SQR). In these operations, operand A is augmented by B in addition, decremented by B for subtraction, and multiplied by B in multiplication, to produce a result (RLT). In the division operation, operand B is divided by A to produce a result (RLT) and a remainder scaled by A (REM/A). In the root-taking operation, RLT is found by taking the square root of a value given by the operand B diminished by a quantity denoted as REM. As is conventional, the square root operation is an iterative one in which the result is a digital value assembled bit-by-bit by operating on the value (B-REM). In each cycle, B is reduced by REM.

At the end of the divide and square root operations, a register (SREG) 16 holds the values (REM/A) and (REM), respectively. This value is denoted as REMAINDER in FIG. 1. The result of the arithmetic operation is held by result register 18 (RESULT) where it is available for use during programming execution.

In keeping with modern functional unit design, the arithmetic unit of FIG. 1 is pipelined, permitting the issue and initiation of an instruction subsequent to the one being performed by the arithmetic unit 14. As an artifact of pipelining, the registers 10 and 12, 14 and 18 are operated in a sequence determined by a process count/control entity 20. The process control entity 20 receives a decoded command (CMD) indicative of the type of operation required by an issued arithmetic instruction. In response to this command, a sequence of gating signals is provided to the registers. A START signal signifying the beginning of an arithmetic operation enters the operands A and B into the registers 10 and 12 and initiates internal operations of the unit. When the divide and square root operations are completed (D/SQ CMP), a remainder value is entered in the SREG 16. Last, the result is registered at 18 in response to a gate result (GRLT) signal.

Residue checking techniques are commonly used in processors to check the ADD, SUBTRACT, and MULTIPLY operations. This invention involves an apparatus which performs a residue check for these operations, as well as for DIVIDE and SQUARE ROOT operations, when all five operations are performed by a pipelined functional unit such as that illustrated in FIG. 1. As is conventional, the algorithms employed by pipelined functional units to use DIVIDE and SQUARE ROOT operations perform iterations which retire one bit of a result per iteration. After a number of cycles, the result and remainder are available as described above.

In order to perform a residue check on the operations undertaken by a pipelined function unit such as that in FIG. 1, the residue of operands A and B and the residue of the result must be generated. For the DIVIDE and SQUARE ROOT operations, the residue of the remainder must also be generated. The residue check is done by performing on the residue of the operands the same operation that is done on the operands by the functional unit. The result of the operations performed on the residue is referred to as the "residue result". If no errors have occurred in either operation, the residue result will be identical to the residue of the functional unit result available in register 18 of FIG. 1. The equations for the operations and the corresponding equations for the residue check are shown in Table 1.

TABLE I

| OPERATION | RESIDUE CHECK |
|---|---|
| ADD: A + B = RLT | RES(A) + RES(B) = RES(RLT) |
| SUBTRACT: A − B = RLT | RES(A) − RES(B) = RES(RLT) |
| MULTIPLY: A × B = RLT | RES(A) × RES(B) = RES(RLT) |
| DIVIDE: A/B = RLT + (REM/A) | RESB/RESA = RES(RLT) + [RES(REM)/RES(A)] |
| SQRT: B − REM = RLT | SQRT [RE(B) − RES(REM)] = RES(RLT) |

In Table I, RES denotes a residue, SQR the square root, A operand A, B, operand B, RLT denotes a result, and REM the remainder.

For the ADD class (ADD and SUBTRACT) and MULTIPLY operations, residue check operations are performed in the same manner as in the functional unit of FIG. 1. For the DIVIDE and SQUARE ROOT operation, the equations are rearranged as follows:

DIVIDE: RES(B)/RES(A) = RES(RLT) +   (1)

[RES(REM)/RES(A)] multiplying both sides by RES(A) yields:

RES(B) = RES(A) × RES(RLT) + RES(REM) subtracting

RES(REM) from both sides: RES(B) − RES(REM) =

RES(A) × RES(RLT)

SQUARE ROOT: SQR[RES(B) − RES(REM)] =   (2)

RES(RLT) squaring both sides yields: RES(B) − RES(REM) =

RES(RLT) × RES(RLT)

Rearranging the equations has reduced the complex residue operations of the DIVIDE and SQUARE ROOT operations into simple equations of ADD and MULTIPLY. Now, residue check hardware can be realized which performs residue checking for the ADD class and MULTIPLY operations and, with the addition of only one residue generator for the remainder, the checker can also perform residue checking for DIVIDE and SQUARE ROOT operations.

Figure 3:
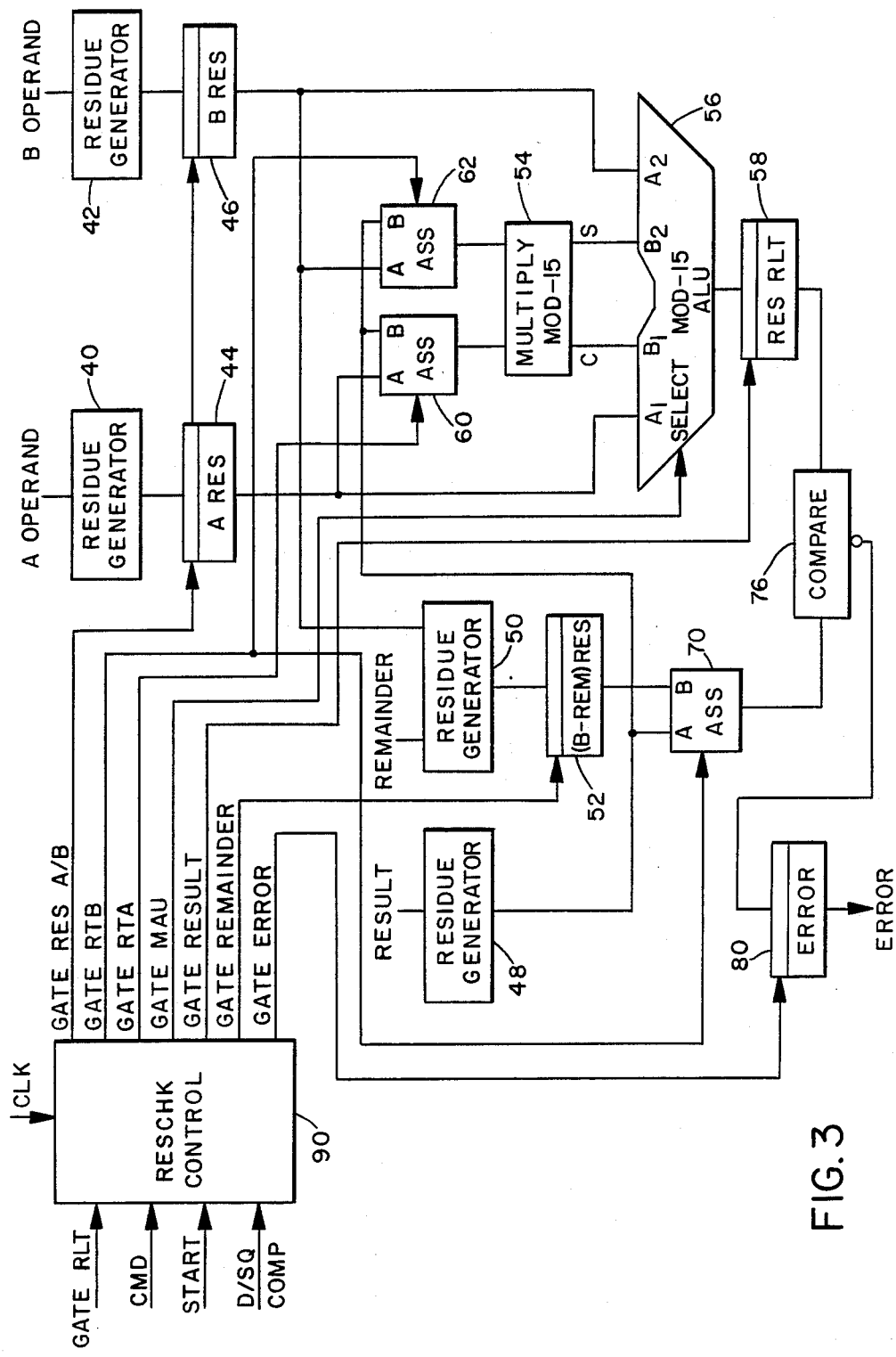
FIG. 3 is a block diagram illustrating the invention.

FIG. 3 illustrates a residue checker which is structured and operates according to the invention. In the residue checker of FIG. 3, four residue generators 40, 42, 48, and 50 are indicated. It is asserted that residue generation is well-known in the art and requires no further explanation here, other than to say that in the preferred embodiment residue is generated in these generators by modulo-15 division. Resultantly, the residue of any binary digital number provided to one of these generators is given by the remainder produced when the number is divided by 15. Residue generation is described specifically for modulo 9 operation in U.S. Pat. No. 3,816,728, incorporated herein by reference, and assigned to the assignee of this application. It is asserted that modulo 15 residue calculation is a simple extension of the teaching in this incorporated patent.

The residue generator 50 generates the residue of the quantity produced by subtracting the remainder from operand B. In this regard, the residue generator 50 operates by first complementing the remainder value and combining the complemented remainder value with operand B to generate the residue of the quantity (B-REM). Again, this is a straight-forward function practiceable by known techniques.

The structure of the invention is now described with reference to FIG. 3. In FIG. 3, the operands A and B are fed from registers 10 and 12, respectively, of FIG. 1 to the residue generators 40 and 42, respectively, in FIG. 3. The residues generated are stored in gated registers 44 and 46. The result value available from the register 18 in FIG. 1 is fed to the residue generator 48, while the complement of the remainder is combined with the residue of operand B in residue generator 50. The residue of the quantity (B - REM) is entered into a gated register 52. An arithmetic unit for combining residue signals available from the gated registers 44 and 46 and the generator 48 includes a mod-15 multiplier 54 and mod-15 arithmetic logic unit (ALU) 56. The ALU 56 includes a conventional gated adder. The ALU 56 will add quantities at ports $A_1$ and $A_2$, or quantities at ports $B_1$ and $B_2$ according to the state of a signal input at a SELECT port of the ALU 56. The inputs to the ALU ports $A_1$ and $A_2$ are obtained from the residue registers 44 and 46, respectively. The inputs to the ALU ports $B_1$ and $B_2$ are taken from the C and S outputs, respectively, of the mod-15 multiplier 54. Thus, for one state of the signal at the select port, the ALU will add the residue of operand A to the residue of operand B. In response to the complementary state of the signal, the ALU 56 will add the C and S signals provided by the multiplier 54. The result of addition performed by the ALU 56 is entered into a gated ALU result register 58. A pair of selection circuits include, first, gated assemblers 60 and 62, and second, a gated assembler 70. The first assembler 60 of the first selection circuit receives at inputs A and B the output of the generator 48 and the register 44. According to a gate signal, the assembler will selectively pass one of the two input signals. The gated assembler 62 similarly passes either the output of the residue generator 48 or the output of the register 46 according to date of the gate signal. The second selection circuit consisting of the gated assembler 70 passes either the output of the residue generator 48 or the output of the gated register 52. A compare circuit 76 consisting of a standard 2-input, 4-bit comparator compares the digital value from the gated assembler 70 with the digital value contained in the register 58. If the values are unequal, the comparator 76 outputs a signal, denoted as the ERROR signal, having a positive value. Otherwise, if the values are identical, the comparator 76 provides a zero or inactive value for the ERROR signal. The ERROR signal output by the comparator 76 is captured in a gated latch 80.

The residue checker of FIG. 3 also includes a residue checker control circuit 90, a conventional clocked, state machine which receives the instruction command (CMD), the clock (CLK), START, GATE RLT, and D/SQ COM signals provided to the arithmetic unit of FIG. 1 by the process count control unit 20. In response to those signals, the control circuit 90 outputs a signal sequence including a plurality of gate signals. In this regard, the first gate signal GATE RES A/B is the gating signal fed to the registers 44 and 46. The GATE MAU signal is fed to the select input of the ALU; 56.

The signal GATE RTA selects one of the two inputs available to the assembler 60. The signal GATE RTB selects one of the two inputs available to the assembler 62 and to the assembler 70. A signal GATE REMAINDER is provided by the control circuit 90 to the register 52, enabling the register 52 to capture the output of the residue generator 50. A signal GATE RESULT provided by the control circuit 90 to the register 58, enables the register to latch the output of the ALU 56. Finally, a GATE ERROR signal latches the output of the comparator 76 into the latch 80.

Figure 4:
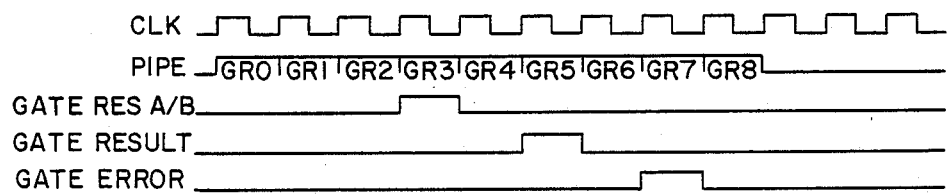
FIGS. 4-7 are waveform diagrams illustrating timing of operations of the invention while performing residue checking of add class, multiply, divide, and square root instruction results.
Figure 5:
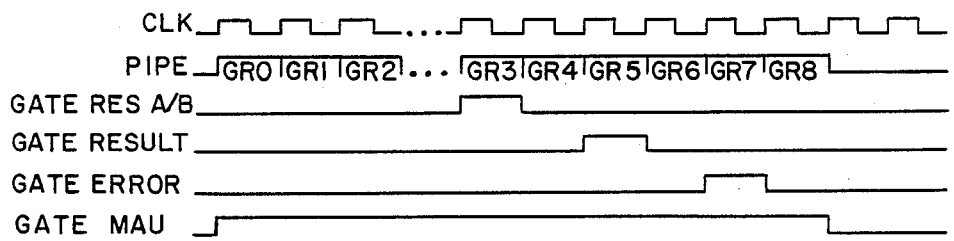
Figure 6:
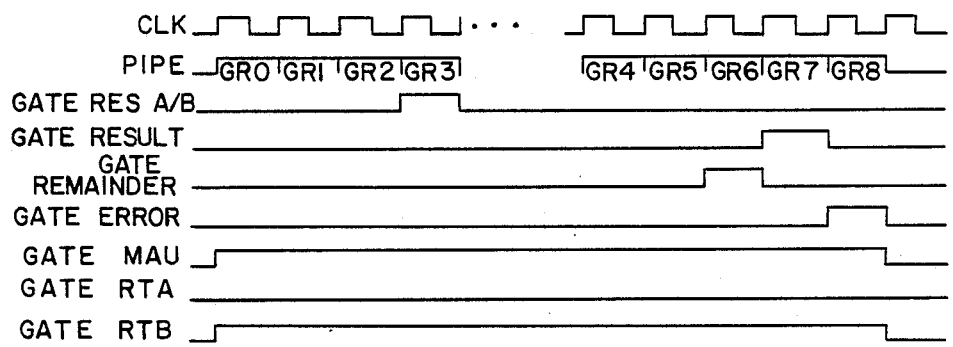
Figure 7:
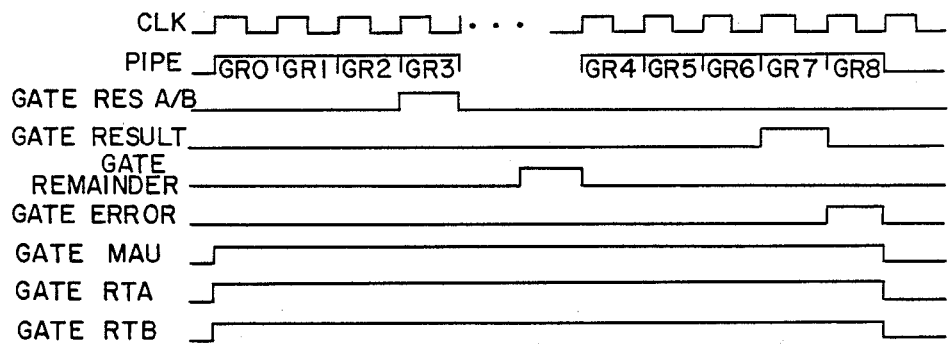

With reference now to FIGS. 4-7, the operation of the residue checker of 53 can be understood. In these figures, waveforms are presented which illustrate the operation. A first waveform in each figure is labeled CLK, and represents a clock signal common to both the functional unit of FIG. 1 and the residue checker of FIG. 3. The clock signal is a conventional cycling clock signal which establishes an 8 cycle pipeline sequence labeled PIPE. Each of the pipeline sequence cycles signifies gating of one of 8 levels of pipeline registers. Thus, the cycle GR2 refers to the pipe cycle in which all registers at level 2 of the pipeline are gated. In FIGS. 5-7, gaps appear in both the CLK and PIPE waveforms, denoting the processing of an iterative algorithm by the functional unit of FIG. 1. The PIPE signal is understood to be internal to the residue checker control unit 90.

FIG. 4 illustrates the operational sequence of the residue checker of FIG. 3 for ADD class operations, including those supporting ADD and SUBTRACT instructions. After the CMD signal for an ADD class instruction is received and decoded by the control circuit 90 and when the START signal is received, denoting commencement of the operation, the A and B operands are available to the residue generators 40 and 42, respectively. During the first PIPE cycle after receipt of the CMD signal and the START signal, the GATE RES A/B signal is pulsed at GR3, resulting in gating of the residue of operand A into register 44 and the residue of operand B into register 46. The GATE MAU signal is inactive. Consequently, the ALU 56 adds the residue of A to the residue of B and provides the result as an output. At the same time, the GATE RTB signal is inactive, resulting in the residue of the result being passed through the gated assembler 70 to the compare circuit 76. At GR5, the GATE RESULT signal is activated, entering the output of the ALU 56 into the register 58. Since the output of register 58 follows its input, the sum of the residues of A and B is also provided to the comparator 76. Now the comparator 76 sets its output according to the equality or inequality of the signals presented at its input. In this case, the input signals are the residue of the result and the sum of the residues of the operands. This residue checking operation satisfies the ADD and SUBTRACT equations given in the first two rows of TABLE I. The output of the comparator 76 is latched into the error latch 80 when the GATE ERROR signal is activated at GR7.

The residue checking operation for the outcome of a MULTIPLY instruction depends on the same residues checked in the add class operations. The sole difference in the operation of the circuit of FIG. 3 is that, during a MULTIPLY operation, the signal GATE MAU is activated by the control circuit 90 to provide the outputs of the multiplier 54 to the ALU 56 through the $B_1$ and $B_2$ inputs, respectively. The multiplier 54 receives the A and B residues through the gated assemblers 60 and 62. In this case, the A and B residues are multiplied in the multiplier 54, with the CARRY and SAVE signals resulting from the multiplication added by the ALU 56 to produce the result of multiplying the operands. This result is compared with the residue of the result, with the ERROR signal being latched as described above. This operation satisfies the equation in the third row of Table I.

FIG. 6 illustrates the timing sequence for a DIVIDE residue check operation. In the residue checking operation for the DIVIDE operation, the output of the multiplier 54 is connected to the ALU by activation of the GATE MAU signal during the GR0 cycle of the PIPE sequence. Simultaneously, the GATE RTB signal is activated. The active GATE RTB signal switches the inputs of the assemblers 62 and 70 from their A to their B ports. Now, the residue of operand A, passing through the assembler 60, is multiplied with the residue of the result, passing through the B input of the assembler 62. The multiplier 54 is connected to the $B_1$ and $B_2$ ports of the ALU 56 by virtue of the activation of the GATE MAU signal. Now, the GATE RTB signal connects the B input of the assembler 70, which is the output of the register 52, to the assembler output. When the DIVIDE operation is complete and after receipt of the D/SQ CMP signal, the output of the residue generator 50 generates the quantity (B-REM) RES, which is gated into the register 52 during the GR6 cycle by the GATE REMAINDER signal. Next, the output of the ALU 56 is captured in register 58 by the activation of the GATE RESULT signal during the GR7 cycle of the PIPE sequence. Now, the comparator 76 compares the product of the residue of operand A and the residue of the result of the DIVIDE operation, the product being held in the register 58, with the value in the register 52, thereby establishing the relationship of equation (1). The result is gated to the register 80 by the GATE ERROR signal in the last cycle of the PIPE sequence.

The operational sequence for the SQUARE ROOT residue checking operation is illustrated in FIG. 7. This residue checking sequence is substantially equivalent to the DIVIDE residue check sequence of FIG. 6 with 2 exceptions. First, the GATE RTA signal is activated concurrently with the GATE MAU and GATE RTB signals. This provides the residue of the result from the generator 48 through both of the assemblers 60 and 62 to the multiplier 54. The effect, of course, is to square the residue of the result, which is required by the right-hand side of the relationship of equation (2). The second difference is the activation of the GATE REMAINDER signal at the end of the iterative square root algorithm, just prior to GR4. This is because the remainder is not a product of the operation, but rather exists at all times during the operation. Therefore, it can be acquired earlier than the division remainder. With the signal sequence as given in FIG. 7, the square of the residue of the functional unit result is compared in the comparator 76 with the quantity in the register 52, thereby establishing the relationship of equation (2). The outcome of the comparison is provided as the error signal latched into the register 80.

Obviously, many modifications and variations of this description of the invention will occur to those skilled in the art without departing from the spirit of this invention.

I claim:

1. In an arithmetic processor which performs arithmetic operations of addition, subtraction, multiplication, division, and square root, said operations being performed on a pair of binary operands A and B, said operations producing a result, at least said division and square root operations on producing a remainder, an improvement for residue checking said results, said improvement comprising:

means for producing residue signals, a first residue signal indicating a residue of A, a second residue signal indicating a residue of B, a third residue signal indicating a residue of said result, and a fourth residue signal indicating a residue of the difference produced by subtracting a remainder from B;

arithmetic means for multiplying two residue quantities to produce a residue result signal;

a first selection means attached to said means for producing said residue signals and to said arithmetic means for selectively providing a pair of said residue signals to said arithmetic means, a first pair of said residue signals including said first residue signal and said third residue signal, a second pair of said residue signals including said second residue signal and said third residue signal; and compare means connected to said means for producing residue signals and to said arithmetic means for comparing said fourth residue signal with said residue result signal to produce an error signal when said fourth residue signal is not equal to said residue result signal.

2. The improvement of claim 1, a third pair of residue signals including said first and said second residue signals, said improvement further including second selection means connected to said means for producing said residue signals and to said compare means, said second selection means for selectively providing said fourth residue signal to said compare means when said first or second pair of residue signals is provided to said arithmetic means and said third residue signal to said compare means when said third pair of residue signals is provided to said arithmetic means.

3. The improvement of claim 1 wherein said arithmetic means includes an adder for adding a pair of residue signals to produce said residue result signal, said adder for adding said first and second residue signals during an add or subtract operation to produce said residue result signal, said improvement further including a second selection means connected to said means for producing said residue signals and to said adder for providing said third residue signal to said compare means when said adder produces said residue result signal and for providing said fourth residue signal to said compare means when said first or second pair of residue signals is provided to said arithmetic means.

4. A residue checker for verifying the result obtained when two operands are added, subtracted or multiplied; for verifying the result and remainder produced by dividing B by A, or for verifying the result produced by taking the square root of the quantity (B-REM), where REM is a remainder, said residue checker comprising:

a plurality of modulo-N dividers, each for producing a modulo-N residue, a first divider producing the residue of A, a second divider producing the residue of B, a third divider producing the residue of the result of an add, subtract, multiply, divide, or square root operation, said operation involving B alone, or A and B, and a fourth divider producing the residue of the difference between B and a remainder of a divide or square root operation;

an arithmetic unit having a first input and a second input, said arithmetic unit producing a residue result, said residue result being the sum of two quantities provided to said first input or the product of two quantities provided to said second input;

first selector means connected to said first, second, and third dividers and to said arithmetic unit for selectively providing said residue of A and said residue of B to said first input when A is added to B, or for providing to said second input said residue of A and said residue of the result when B is divided by A or said residue of said result and said residue of said result when the square root of (B-REM) is taken;

second selector means connected to said third and said fourth dividers for providing a selected signal, said selected signal being said residue of said result when A is added to B or said residue of said difference when B is divided by A or when the square root of (B-REM) is taken; and a comparator connected to said arithmetic unit and to said second selector means for comparing said residue result with said selected signal to produce an error signal conditioned to indicate the equality or inequality of said residue result signal and said selected signal.

* * * * *

UNITED STATES PATENT AND TRADEMARK OFFICE
CERTIFICATE OF CORRECTION

PATENT NO. : 4,926,374

DATED : May 15, 1990

INVENTOR(S) : Schaffer

It is certified that error appears in the above-identified patent and that said Letters Patent is hereby corrected as shown below:

Col. 8, line 4, please delete "on".

Signed and Sealed this

Twenty-third Day of July, 1991

Attest:

HARRY F. MANBECK, JR.

*Attesting Officer*

*Commissioner of Patents and Trademarks*